United States Patent [19]

Welch et al.

[11] 4,410,671

[45] Oct. 18, 1983

[54] CATALYST, METHOD OF PRODUCING THE CATALYST, AND POLYMERIZATION PROCESS EMPLOYING THE CATALYST

[75] Inventors: Melvin B. Welch, Bartlesville, Okla.; Richard E. Dietz, Borger, Tex.; Charles E. Capshew, Bartlesville, Okla.

[73] Assignee: Phillips Petroleum Company, Bartlesville, Okla.

[21] Appl. No.: 350,686

[22] Filed: Feb. 22, 1982

Related U.S. Application Data

[62] Division of Ser. No. 177,312, Aug. 12, 1980, Pat. No. 4,326,988.

[51] Int. Cl.$^3$ .......................... C08F 4/02; C08F 10/00
[52] U.S. Cl. .................................... 526/119; 526/114; 526/116; 526/122; 526/124; 526/125; 526/352; 526/904; 525/268
[58] Field of Search ............... 526/114, 116, 119, 122, 526/124, 125; 525/268

[56] References Cited

U.S. PATENT DOCUMENTS

| | | | |
|---|---|---|---|
| 3,901,863 | 8/1975 | Berger et al. | 526/116 |
| 4,158,088 | 6/1979 | Iwao et al. | 526/903 |
| 4,187,385 | 2/1980 | Iwao et al. | 526/904 |
| 4,287,328 | 9/1981 | Kikuta et al. | 526/97 |
| 4,295,991 | 10/1981 | Wristers | 526/142 |
| 4,309,521 | 1/1982 | Sato et al. | 526/904 |

FOREIGN PATENT DOCUMENTS 2024832 1/1980 United Kingdom.

*Primary Examiner*—Edward J. Smith

[57] ABSTRACT

A transition metal compound and a metal halide compound are chemically combined to form a composition of matter. The composition of matter is mixed with a precipitating agent to form an active olefin polymerization catalyst. The catalyst can be further treated with a halide ion exchanging source to form an active olefin polymerization catalyst. Prepolymer is deposited on the catalyst(s) in an amount effective to reduce polymer fines when the catalyst(s) are used in polymerization processes.

34 Claims, No Drawings

CATALYST, METHOD OF PRODUCING THE CATALYST, AND POLYMERIZATION PROCESS EMPLOYING THE CATALYST

CROSS REFERENCE TO RELATED APPLICATIONS

This is a divisional of copending application Ser. No. 177,312, filed Aug. 12, 1980 which issued as U.S. Pat. No. 4,326,988 on Apr. 27, 1982.

BACKGROUND OF THE INVENTION

The invention relates to catalysts, a method of producing the catalysts and a process using the catalysts. In another aspect, the invention relates to a particularly effective ethylene polymerization catalyst and process.

In the production of polyolefins, such as for example polyethylene, polypropylene, ethylene-butene copolymers etc., an important aspect of the various processes and catalysts used to produce such polymers is the productivity. By productivity is meant the amount or yield of solid polymer that is obtained by employing a given quantity of catalyst. If the productivity is high enough then the amount of catalyst residues contained in the polymer is low enough that the presence of the catalyst residues does not significantly affect the properties of the polymer and the polymer does not require additional processing to remove the catalyst residues. As those skilled in the art are aware, removal of catalyst residues from polymer is an expensive process and it is very desirable to employ a catalyst which provides sufficient productivity so that catalyst residue removal is not necessary.

In addition to productivity of a catalyst, another important aspect of a process and a catalyst is the properties of the polymer particles. It is desirable to produce polymer particles which are characterized by strength, uniformity of size, and relatively low fines. Although polymer fluff having relatively high percentages of fines can be handled with plant modifications, a polymer of high productivity and low fines is highly desirable.

Accordingly, an object of the invention is a catalyst.

Another object of the invention is a polymerization process for using the catalyst capable of providing excellent polymer productivities as compared to prior art catalysts.

Another object of the invention is a catalyst and a polymerization process in which the polymer produced contains catalyst residues in an amount so that catalyst residue removal is unnecessary.

Another object is a catalyst characterized by high productivity and low fines.

Another object is a polymerization process for using the catalyst capable of providing improved polymer productivities with low fines.

The invention can be understood by reference to the following description.

SUMMARY OF THE INVENTION

According to the invention a catalyst is provided which is prepared by mixing together a metal halide compound and a transition metal compound to produce a first catalyst component. The first catalyst component can be dissolved in a dry inert solvent to produce a first catalyst component solution. A second catalyst component comprising a precipitating agent as hereinafter defined is mixed with the above-mentioned first catalyst component solution to produce a solid catalyst in the form of a slurry. A small but effective amount of olefin polymer is prepolymerized on the solid catalyst in an amount effective to reduce polymer fines when the catalyst is employed in an olefin polymerization process.

Further according to the invention, the solid catalyst can be treated with a halide ion exchanging source as herein defined to produce a catalyst. When it is also desired to treat the catalyst with a halide ion exchange source, the catalyst can be so treated before or after the prepolymerization step.

Further according to the invention the thus treated catalyst can have a small but effective amount of an olefin polymer deposited thereon.

Further according to the invention, the reaction of the first catalyst component and the second catalyst component can occur at a temperature in the range of about $-100°$ C. to about $50°$ C.

Further according to the invention are methods of making the catalysts according to the invention.

Further according to the invention are polymerization processes utilizing catalysts according to the invention.

DETAILED DESCRIPTION OF THE INVENTION

According to the invention catalysts are produced by reacting a first catalyst component and a second catalyst component as herein described to produce a precipitated solid catalyst in a precipitation step. The solid catalyst can then have prepolymer deposited thereon and be subsequently treated with a halide ion exchanging source as herein defined. Alternatively, the solid catalyst can be treated with a halide ion exchanging source, and then have prepolymer deposited thereon. Alternatively, the solid catalyst can have prepolymer deposited thereon, be subsequently treated with a halide ion exchanging source, and then have further prepolymer deposited thereon.

The catalysts of the invention thus include the step of polymerizing a small amount of olefin as hereinafter described onto the precipitated solid catalyst following the precipitation step and/or onto the catalyst following the treatment with the halide ion exchanging source. The polymer thus formed on the precipitate and/or on the catalyst is herein denoted prepolymer for convenience; the process of depositing polymer on the catalyst is denoted prepolymerization; and a catalyst having polymer deposited thereon is denoted a prepolymerized catalyst. The amount of prepolymer formed on the precipitate and/or on the catalyst can be from about 1% to about 50% or even higher by weight of the total prepolymerized catalyst. There is no exact upper limit to the amount of prepolymer which can be formed on the catalyst except as determined by the practicality of the situation. The lower limit is determined by an amount effective to reduce fines produced during polymerization using the catalyst to an acceptable level. Any amount of prepolymer can be expected in accordance with the invention to at least contribute to the reduction of polymer fines during polymerization using the catalyst. Preferably, however, the prepolymer can be in the range of about 1% to about 50% by weight based upon the weight of the total composition, because it has been found that catalysts having amounts of prepolymer greater than those in this range do not feed well in conventional catalyst feeders. More preferably, the prepolymer can comprise in the range of about 3% to about 40% by weight based upon the total composition, and most preferably between about 5% and about 20% by weight because catalysts having prepolymer in these ranges show good feeding characteristics and large reduction of polymer fines. The prepolymerization is further discussed below.

The catalyst of the present invention comprises a composition of matter resulting from the chemical combination of a metal halide compound and a transition metal compound wherein the metal halide compound is selected from metal dihalides and metal hydroxyhalides and the metal of the metal halide compound is selected from Group IIA and Group IIB metals of the Mendeleev Periodic Table and wherein the transition metal of the transition metal compound is selected from Group IVB and Group VB transition metals of the Mendeleev Periodic Table and the transition metal is bonded to at least one atom selected from oxygen, nitrogen and sulfur, and said oxygen, nitrogen and sulfur atoms are in turn bonded to a carbon atom of a carbon containing radical. As used herein by the term "Mendeleev Periodic Table" is meant the Periodic Table of the Elements as shown in the inside front cover of Perry, *Chemical Engineer's Handbook*, 4th Edition, McGraw Hill & Co. (1963).

As noted above the metal halide compound is selected from metal dihalide compounds and metal hydroxyhalide compounds and the metal of the metal halide compound is selected from Group IIA and Group IIB metals, such as for example beryllium, magnesium, calcium and zinc. Some suitable metal halide compounds include for example, beryllium dichloride, beryllium dibromide, beryllium hydroxyiodide, magnesium dichloride, magnesium bromide, magnesium hydroxychloride, magnesium diiodide, magnesium difluoride, calcium dichloride, calcium dibromide, calcium hydroxybromide, zinc dichloride, zinc difluoride, and zinc hydroxychloride. While metal hydroxyhalide compounds are known in the art, they are not as common and as readily available as metal dihalide compounds; therefore, metal dihalides are preferred. Of the metal dihalides, magnesium dihalides, and particularly magnesium dichloride is preferred because it is readily available and relatively inexpensive and has provided excellent results. The metal dihalide component is generally used in the form of an anhydrous, particulate solid to facilitate its reaction with the transition metal compound. It is also noted that various techniques for converting a metal halide compound to a fine particulate form, such as for example roll milling, reprecipitating, etc., can be used to prepare the metal halide compound for use according to the present invention and that such additional preparation of the metal halide compound promotes the reaction of the metal halide compound with the transition metal compound; however, it does not appear to make any difference in a catalyst of the present invention prepared from a composition of matter of the present invention if the metal halide compound is in a fine particulate form, that is, polymer productivity, for example, is not a function of the size of the particles of the metal halide compound. Preparation of metal hydroxyhalide compounds are described in K. Soga, S. Katano, Y. Akimoto and T. Kagiya, "Polymerization of alpha-Olefins with Supported Ziegler-type Catalysts", *Polymer Journal*, Vol. 2, No. 5, pp. 128–134 (1973).

The transition metal of the transition metal compound noted above is selected from Group IVB and Group VB transition metals and is generally selected from titanium, zirconium, and vanadium although other transition metals can be employed. Excellent results have been obtained with titanium compounds and they are preferred. Some of the titanium compounds suitable for use include for example titanium tetrahydrocarbyloxides, titanium tetraimides, titanium tetraamides and titanium tetramercaptides. Other transition metal compounds include for example zirconium tetrahydrocarbyloxides, zirconium tetraimides, zirconium tetraamides, zirconium tetramercaptides, vanadium tetrahydrocarbyloxides, vanadium tetraimides, vanadium tetraamides and vanadium tetramercaptides.

The titanium tetrahydrocarbyloxides are the preferred titanium compounds because they produce excellent results and are readily available. Suitable titanium tetrahydrocarbyloxide compounds include those expressed by the general formula $$Ti(OR)_4$$

wherein each R is individually selected from an alkyl, cycloalkyl, aryl, alkaryl, and aralkyl hydrocarbon radical containing from about 1 to about 20 carbon atoms per radical and each R can be the same or different. Titanium tetrahydrocarbyloxides in which the hydrocarbyl group contains from about 1 to about 10 carbon atoms per radical are most often employed because they are more readily available. Suitable titanium tetrahydrocarbyloxides include, for example, titanium tetramethoxide, titanium dimethoxydiethoxide, titanium tetraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetra-p-tolyloxide and titanium tetraphenoxide.

Of the titanium tetrahydrocarbyloxides, titanium tetraalkoxides are generally preferred and titanium tetraethoxide is particularly preferred because of the excellent results obtained employing this material. Titanium tetraethoxide is also generally available at a reasonable cost.

The molar ratio of the transition metal compound to the metal halide compound can be selected over a relatively broad range. Generally the molar ratio is within the range of about 10:1 to about 1:10, preferably between about 3:1 and 0.5:2, however, the most common molar ratios are within the range of about 2:1 to about 1:2. When titanium tetrahydrocarbyloxide and magnesium dichloride are employed to form a composition of matter of the invention, a molar ratio of titanium to magnesium of about 2:1 is presently recommended as most all the magnesium compound apparently goes into solution easily.

The metal halide compound and the transition metal compound employed in the present invention are normally mixed together by heating, e.g. refluxing, these two components together in a suitable dry (essential absence of water) solvent or diluent, which is essentially inert to these components and the product produced. By the term "inert" is meant that the solvent does not chemically react with the dissolved components such as to interfere with the formation of the product or the stability of the product once it is formed. Such solvents or diluents include, for example, n-pentane, n-hexane, n-heptane, methylcyclohexane, toluene, xylenes and the like. Aromatic solvents can be preferred, such as for example xylene, because the solubility of the metal halide compound and the transition metal compound is higher in aromatic solvents as compared to aliphatic solvents, although for other reasons aliphatic solvents can be preferred. Thus, for example, when solvent is removed from the precipitated catalyst by decantation or by filter stick, somewhat faster settling rates can be obtained with aliphatic than with aromatic solvents. Generally the amount of solvent or diluent employed can be selected over a broad range. Usually the amount of solvent or diluent is within the range of about 1 to about 100, more preferably about 20 to about 100 cc per gram of metal dihalide. The temperature employed during the heating step can also be selected over a broad range. Normally the heating temperature is within the range of about 15° C. to about 150° C. when the heating step is carried out at atmospheric pressure. Obviously the heating temperatures employed would be higher if the pressure employed is above atmospheric pressure. The pressure employed during the heating step does not appear to be a significant parameter. The heating step insures rapid dissolution of solid metal halides. In addition to the above noted solvents or diluents, more polar solvents or diluents such as nitrobenzene and halogenated hydrocarbons, e.g. methylene chloride, chlorobenzene and 1,2-dichloroethane can be used, particularly when producing compositions of the invention having a molar ratio of the transition metal compound to the metal dihalide compound of other than 2:1. In addition, normal saturated alkanols, such as, for example, ethanol, n-butanol and the like, and saturated ethers particularly saturated cyclic ethers such as, for example, tetrahydrofuran, can be used alone or in combination with the previously mentioned solvents or diluents in producing prepolymerized catalyst compositions according to the invention. Mixed solvents or diluents, such as for example, a mixture of n-hexane and tetrahydrofuran having a volume/volume ratio of, for example, about 50/50 can be employed in solubilizing hydrocarbon-soluble metal dihalides which are relatively difficult to solubilize, such as, for example, zinc dichloride and the like. Other suitable mixtures of two or more of the above solvents to solubilize the reagents of the first catalyst component can of course also be used and can be readily determined by one of ordinary skill in the art.

Generally, the time required for heating these two components together is within the range of about 5 minutes to about 10 hours, although in most instances a time within the range of about 15 minutes to about 3 hours is sufficient. Following the heating operation, the resulting solution can be filtered to remove any undissolved material or extraneous solid, if desired. The composition of matter of the present invention thus produced and which is in solution can be recovered from the solvent or diluent by crystallation or other suitable means.

It is also emphasized that the compositions of matter as herein defined are prepared in an oxygen free system e.g., absence of air as well as a dry system i.e., absence of water. Generally a dry box is employed in small preparations as known in the art to prepare the compositions of the present invention usually employing a dry oxygen free nitrogen atmosphere.

With respect to the compositions of matter as herein defined the following example is provided for purposes of illustration.

EXAMPLE I (First Catalyst Component Preparation)

Preparation of the first catalyst component was carried out by reacting 2 moles of titanium tetraethoxide and 1 mole of magnesium dichloride in hydrocarbon solution. All mixing, filtering and washing operations were conducted in a dry box under a nitrogen atmosphere. Anhydrous, powdered magnesium dichloride amounting to 4.758 g (0.050 mole) was roll milled and mixed with 23.010 g (0.101 mole) of titanium tetraethoxide in 200 ml of dry n-heptane in a flask equipped for stirring and refluxing. Under a nitrogen purge, the mixture was stirred, heated to refluxing temperature, refluxed for 45 minutes and cooled to room temperature to yield a solution containing a very small amount of undissolved residue. The reaction mixture was suction filtered to remove the residue to obtain a clear, colorless solution. The solution contained in a flask was first cooled in an ice bath to a temperature of about 0° C. and then to a temperature of about $-22°$ C. using a freezer to yield a relatively small crop of crystals. To increase the yield, the mother liquor was heated to boiling under a nitrogen purge to remove about $\frac{1}{3}$ of the volume by evaporation. The resulting solution was cooled to room temperature, then to $-22°$ C. and finally to about $-78°$ C. in a dry ice-isopropanol bath for about 1 hour. The mother liquor was pumped off the crystals that had formed and the crystals were rinsed off with three 20 ml portions of dry n-hexane cooled to about $-78°$ C. The liquid remaining after the last rinse was pumped off and the product was dried overnight under a nitrogen purge to obtain 23.6 g of white crystals amounting to 85% of the theoretical yield.

Elemental analysis of a portion of the composition was performed with the following results, in terms of wt. %.

|  | C | H | Cl | Mg | Ti | O |
|---|---|---|---|---|---|---|
| Calculated | 34.84 | 7.32 | 12.85 | 4.41 | 17.37 | 23.21 |
| Found | 32.02 | 7.21 | 13.3 | 3.88 | 17.3 |  |

The results indicate that a composition having a formula consistent with $2Ti(OC_2H_5)_4 \cdot MgCl_2$ was formed and recovered. Thus the composition apparently had a molar ratio of two moles of titanium to one mole of magnesium.

A sample of the white crystals was analyzed by powder X-ray diffraction under conditions to exclude the presence of air and water. The sample revealed the following characteristics:

TABLE I

| interplanar spacing (Meter $\times 10^{-10}$) | relative intensity of spectrum |
|---|---|
| 10.77 | weak |
| 10.47 | very strong |
| 9.28 | very weak |
| 8.73 | weak |
| 8.23 | very strong |
| 8.10 | moderate |
| 7.91 | very strong |
| 7.43 | strong |
| 7.27 | strong |
| 6.52 | weak |
| 6.41 | weak |
| 6.10 | weak |
| 4.90 | very weak |
| 4.42 | very weak |

TABLE I-continued

| interplanar spacing (Meter × $10^{-10}$) | relative intensity of spectrum |
|---|---|
| 4.40 | very weak |
| 4.09 | very weak |
| 3.86 | very weak |

The interplanar spacing lines were sharp and in view of the above number of interplanar spacings it is apparent that the composition formed has essentially a crystalline structure.

The catalysts on which prepolymer is deposited in accordance with the invention are made up of two components. The first catalyst component comprises a composition of matter as described above in Example I and preceding text, and the second catalyst component comprises a precipitating agent. Particularly effective catalysts on which the prepolymer is deposited have been obtained by treating the abovedescribed catalyst comprising said first catalyst component and said second catalyst component with a halide ion exchanging source, such as for example titanium tetrahalide before or after the prepolymer is deposited thereon. For convenience, the designation "catalyst A" refers to those catalysts which have not been treated with a halide ion exchanging source and the term "catalyst B" refers to those catalysts which have been so treated whether or not prepolymer has been deposited thereon in accordance with the present invention. In other words, catalyst A includes both the catalyst produced by reacting the first and second catalyst components on which prepolymer is deposited in accordance with the invention, hereinafter referred to as prepolymerized catalyst A, as well as such catalyst on which prepolymer has not been deposited, hereinafter referred to as nonprepolymerized catalyst A. Catalyst B is catalyst A which is treated with a halide ion exchanging source whether or not prepolymer has been deposited thereon in accordance with the present invention. It has also been found desirable to employ either prepolymerized catalyst A or prepolymerized catalyst B with a cocatalyst comprising an organometallic compound.

The metal halide compounds and the transition metal compounds suitable for producing the first catalyst component of the present invention were described above as was the general and specific nature of the composition of matter. It is noted that the composition of matter need not be recovered from the diluent or solvent, such as by crystallation, prior to using such material to produce the catalysts of the present invention. Good results have been obtained by employing the first catalyst component solution which was produced when the composition of matter was prepared as well as employing composition of matter recovered from the diluent or solvent.

The metal halide compound/transition metal compound solution or first component solution (which can be formed by dissolving the recovered composition in a suitable solvent or which can be formed initially without recovering the composition of matter from the solvent) can then be contacted with hydrocarbon solution containing the second component of the catalyst. A solid reaction product is formed which precipitates out of the solution.

The second catalyst component is a precipitating agent selected from the group consisting of organometallic compounds in which the metal is selected from metals of Groups I to III of the Mendeleev Periodic Table, metal halides and oxygen-containing halides of elements selected from Groups IIIA, IVA, IVB, VA, and VB of the Mendeleev Periodic Table, hydrogen halides, and organic acid halides expressed as

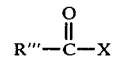

wherein R''' is an alkyl, aryl, cycloalkyl group or combinations thereof containing from 1 to about 12 carbon atoms and X is a halogen atom.

Some organometallic compounds in which the metal is selected from metals of Group I, Group II, and Group III of the Mendeleev Periodic Table suitable for use as the second component include, for example, lithium alkyls, Grignard reagents, dialkyl magnesium compounds, dialkyl zinc compounds, organoaluminum compounds, etc. The organometallic compound of the second catalyst component is generally an organoaluminum halide compound which includes for example, dihydrocarbylaluminum monohalides of the formula $R'_2AlX$, monohydrocarbylaluminum dihalides of the formula $R'AlX_2$ and hydrocarbylaluminum sesquihalides of the formula $R'_3Al_2X_3$ wherein each R' in the above formulas is individually selected from alkyl, cycloalkyl, aryl, alkaryl, and aralkyl hydrocarbon radicals containing from 1 to about 20 carbon atoms per radical and can be the same or different and each X is a halogen atom and can be the same or different. Some suitable organoaluminum halide compounds include, for example, methylaluminum dibromide, ethylaluminum dichloride, ethylaluminum diiodide, isobutylaluminum dichloride, dodecylaluminum dibromide, dimethylaluminum bromide, diethylaluminum chloride, diisopropylaluminum chloride, methyl-n-propylaluminum bromide, di-n-octylaluminum bromide, diphenylaluminum chloride, dicyclohexylaluminum bromide, dieicosylaluminum chloride, methylaluminum sesquibromide, ethylaluminum sesquichloride, ethylaluminum sesquiiodide, and the like. Ethylaluminum sesquichloride, ethylaluminum dichloride, and diethylaluminum chloride have been employed with good results and are preferred. The most preferred organoaluminum halide compound is ethylaluminum sesquichloride, which produced the best results.

Some metal halides and oxygen-containing halides of elements selected from Groups IIIA, IVA, IVB, VA, and VB suitable for use as the second component preferably include such as, for example, aluminum tribromide, aluminum trichloride, aluminum triiodide, tin tetrabromide, tin tetrachloride, silicon tetrabromide, silicon tetrachloride, phosphorous oxychloride, phosphorous trichloride, phosphorous pentabromide, vanadium tetrachloride, vanadium oxytrichloride, vanadyl trichloride, zirconium tetrachloride, and the like.

The hydrogen halides suitable for use as the second catalyst component include preferably such as, for example, hydrogen chloride, hydrogen bromide, and the like.

The organic acid halides suitable for use as the second catalyst component preferably include such as, for example, acetyl chloride, propionyl fluoride, dodecanoyl chloride, 3-cyclopentylpropionyl chloride, 2-naphthoyl chloride, benzoyl bromide, benzoyl chloride, and the like.

The molar ratio of the transition metal compound of the first catalyst component to the second catalyst component can be selected over a relatively broad range. Generally, the molar ratio of the transition metal of the first catalyst component to the second catalyst component is within a range of from about 10:1 to about 1:10 and more generally within a range of about 2:1 to about 1:3 since a molar ratio within the latter range usually produces a catalyst which can be employed as an especially active ethylene polymerization catalyst.

The temperature employed while mixing the first and second catalyst components as above described can be selected over a broad range. Generally the temperature employed is within a range of about −100° C. to about 50° C. or higher, while temperatures within the range of about 0° C. to about 30° C. or somewhat higher were most often employed, most preferably about 20° C. to 30° C. or somewhat higher or room temperature. Since heat is evolved when the first catalyst component and the second catalyst component are mixed, the mixing rate is adjusted as required and additional cooling is employed if needed in order to maintain a relatively constant mixing temperature. It is noted with respect to mixing the first and second components that the order of addition is not important and either component can be added to the other or both can be added simultaneously and/or stoichiometrically to a common vessel. After completing the mixing, the resulting slurry is stirred or agitated for a sufficient time, generally within a range of about 15 minutes to about 5 hours to insure that mixing of the components is complete. It is recommended that the stirring or agitation be carried out whereby the slurry is maintained at the mixing temperature for the first 5 to about 30 minutes after mixing or more preferably from about 5 minutes to about 20 minutes. Thereafter, stirring can be discontinued and the solid product recovered by filtration, decantation, and the like. The product can then be washed with a suitable material such as a hydrocarbon, e.g., n-pentane, n-heptane, cyclohexane, benzene, xylenes and the like, to remove any soluble material which may be present. The product can then be dried and stored under dry nitrogen. The products formed in this manner are designated as catalyst A as previously described.

According to the invention, prepolymer can be prepolymerized onto the composition formed by the reaction between the first component and the second component and the prepolymerized catalyst composition can be recovered and used in polymerization processes.

The prepolymerization step can comprise, as indicated above, prepolymerizing a minor but effective amount of aliphatic olefin onto the precipitate produced by the reaction between the first component and the second component.

The prepolymerizing step can be performed by any method effective for prepolymerizing polymer onto the precipitate. For example, the precipitating step can be entirely carried out under an olefin atmosphere; or the precipitating step can be carried out by adding a portion of the precipitating agent under a dry inert atmosphere followed by adding another portion of the precipitating agent under an olefin atmosphere; or other variations can be employed by one skilled in the art in accordance with the invention. Preferably, the prepolymerizing step is carried out by adding the precipitating agent under an olefin atmosphere, for example, ethylene, to the first component, with stirring, and recovering the precipitate, preferably with washing although not necessarily. Prepolymerized catalysts prepared in this manner provide low fines content polymer when used in polymerization.

Olefins as herein described, such as, for example, aliphatic mono-1-olefins, for example, ethylene, can be prepolymerized onto the catalysts of the present invention without difficulty. However, such prepolymerizations require not only an adequate amount of cocatalyst as herein described below for polymerization processes using the catalysts of the invention, for example, triethylaluminum and the like, but also a substantive time to allow prepolymerization to proceed. The amount of cocatalyst required can be readily determined according to the invention from the description and the examples set out below. The molar ratio of the organometallic compound of the cocatalyst as herein defined to the transition metal compound of the first catalyst component is not particularly critical and can be selected over a relatively broad range. Generally, the molar ratio of the organometallic compound to the transition metal compound is within a range of about 1:100 to about 1500:1. More preferably, the molar ratio is in the range of about 1:20 to about 20:1 and most preferably about 1:10 so that the cocatalyst will be present in adequate amounts to initiate polymerization while allowing good control of the reaction.

The monomer which is utilized for prepolymerization can be the same as or different from the monomer used in polymerization as set out herein. Preferably the same monomer is used for convenience. The aliphatic mono-1-olefins used for prepolymerization can preferably have between 2 and about 10 carbon atoms per molecule and broadly between 2 and about 18 carbon atoms per molecule. Prepolymerization can also use conjugated diolefins, preferably such as having from 4 to 8 carbon atoms per molecule. Most preferably ethylene is used for prepolymerization particularly where the prepolymerized catalyst is to be used to polymerize ethylene monomer.

The weight of prepolymer on the prepolymerized catalyst based on the total weight of the prepolymerized catalyst, as indicated above, is preferably from about 1 to about 50% by weight of the prepolymerized catalyst, more preferably from about 3% to about 40% by weight, and most preferably from about 5% to about 20% by weight of the prepolymerized catalyst since this results in a catalyst with good feeding characteristics that can produce a polymer having relatively low fines content.

In one embodiment of the invention, the prepolymerized catalyst A composition formed by the reaction between the first catalyst component and the second catalyst component can be recovered after deposition of prepolymer thereon and used in polymerization preferably in combination with a cocatalyst comprising an organometallic compound as herein defined.

According to another aspect of the invention, catalyst A which does not have prepolymer deposited thereon can be treated with a halide ion exchanging source such as for example a halide of a transition metal in order to produce a catalyst of enhanced activity, referred to generally as nonprepolymerized catalyst B. The term "halide ion exchanging source" is herein used for convenience; however, it is not intended thereby to limit the invention by the theory whereby the action of such compounds can be explained. Rather, the invention encompasses the compounds used whatever the theory of action may be. Prepolymerized catalyst B can then be produced by depositing prepolymer on non-prepolymerized catalyst B in accordance with the invention. Some examples of suitable halide ion exchanging sources that can be employed are titanium tetrahalides, such as titanium tetrachloride, vanadium oxychloride, and zirconium tetrachloride. Because titanium tetrachloride is readily available and produced excellent results after somewhat extensive experimentation, it is preferred.

Generally, treating the nonprepolymerized catalyst A with the halide ion exchanging source to produce nonprepolymerized catalyst B takes place in a suitable diluent such as a hydrocarbon diluent, for example, n-pentane, n-heptane, cyclohexane, benzene, xylenes, and the like, to facilitate the treating process. The treating temperature can be selected over a relatively broad range and is normally within a range of about 0° C. to about 200° C.; however, temperatures about 20° C. to about 30° C. or room temperature are currently preferred.

According to the present invention, both the addition temperature and the treating temperature are preferably in the range of about 20° C. to 30° C. or room temperature for convenience.

The treating time for the halide ion exchanging source can also be selected over a broad range and generally is within the range of about 10 minutes to about 10 hours. While the weight ratio of the halide ion exchanging source to prepolymerized or nonprepolymerized catalyst A as the case may be can be selected over a relatively broad range, the weight ratio of the halide ion exchanging source to catalyst A is generally within a range of about 10:1 to about 1:10 and more generally from about 7:1 to about 1:4. Following the treatment of catalyst A with the halide ion exchanging source the surplus halide ion exchanging source (the halide ion exchanging source which is not bound to catalyst B) is removed by washing catalyst B with a dry (essential absence of water) liquid such as a hydrocarbon of the type previously disclosed, n-hexane, or xylene for example.

After treatment of the nonprepolymerized catalyst A composition with the halide ion exchanging source, the reaction product can have prepolymer deposited thereon in accordance with the invention. For example, the reaction product can be separated from a reaction mix or diluent and prepolymer deposited thereon in accordance with the invention.

The resulting product, prepolymerized catalyst B after drying, can be stored under an inert atmosphere, such as dry nitrogen. It is found in general that catalyst B can be stored for a month or longer without significant decrease in activity.

According to another aspect of the invention catalyst A which has had prepolymer deposited thereon can be treated with a halide ion exchanging source, such as, for example, a halide of a transition metal in order to produce a catalyst of enhanced activity. One example of a preferable halide ion exchanging source of those set out generally above is titanium tetrachloride, because titanium tetrachloride is readily available and produced excellent results. In general the treatment of prepolymerized catalyst A with the halide ion exchanging source can be carried out as indicated above for the treatment of nonprepolymerized catalyst A. However, to some extent, the temperature at which the halide ion exchanging treatment is carried out will depend upon the time when prepolymer is deposited on the catalyst. Thus when prepolymer is applied to the catalyst prior to the halide ion exchanging source treatment step, then the temperature used during the halide ion exchanging source treatment is preferably generally below about 100° C., more preferably from about 15° C. to about 90° C., most preferably from about 15° C. to about 50° C., to avoid dissolving the prepolymer in the hydrocarbon solution containing the halide ion exchanging source, such as, for example titanium tetrachloride, and the like. Treating with the halide ion exchanging source at a temperature in the range of about 20° C. to about 30° C. is currently particularly preferred for convenience.

According to yet other aspects of the invention the product obtained by treatment of prepolymerized catalyst A with the halide ion exchanging source can have prepolymer deposited thereon, thereby producing catalyst B having prepolymer twice deposited thereon.

If desired, any catalyst A or catalyst B according to the invention can be admixed with a particulate diluent such as, for example, silica, silica-alumina, silica-titania, magnesium dichloride, magnesium oxide, polyethylene, polypropylene, and poly(phenylene sulfide), prior to using the catalyst in a polymerization process. While the weight ratio of the particulate diluent to catalyst can be selected over a relatively wide range, the weight ratio of particulate diluent to catalyst generally is within the range of about 100:1 to about 1:100. More often, the weight ratio of particulate diluent to catalyst is within the range of about 20:1 to about 2:1 and use of a particulate diluent has been found effective to facilitate charging of the catalyst to the reactor.

While it may not be necessary in all instances to employ a cocatalyst with the catalyst of the present invention, the use of cocatalysts is recommended for best results. The organometallic cocatalysts suitable for use in accordance with the invention are the same as the organometallic compounds suitable for use as the second component of the catalyst of the present invention previously described and in addition to organometallic compounds represented by the general formulas $R''AlX_2$, $R''_2AlX$ and $R''_3Al_2X_3$, suitable cocatalysts also include compounds of the formula $R''_3Al$ in which $R''$ is the same as $R'$ defined above. Of the organometallic cocatalysts, the organoaluminum cocatalysts are preferred and in addition to those described above as suitable for use as the second component of the catalyst the additional organoaluminum compounds of the formula $R''_3Al$ include, for example, trimethylaluminum, triethylaluminum, triisopropylaluminum, tridecylaluminum, trieicosylaluminum, tricyclohexylaluminum, triphenylaluminum, 2-methylpentyldiethylaluminum, and triisoprenylaluminum. Triethylaluminum is preferred since this compound produced excellent results in the runs hereafter described.

The molar ratio of the organometallic compound of the cocatalyst to the transition metal compound of the first catalyst component is not particularly critical and can be selected over a relatively broad range. Generally, the molar ratio of the organometallic compound of the cocatalyst to the transition metal compound of the first catalyst component is within a range of about 1:1 to about 1500:1.

A variety of polymerizable compounds are suitable for use in the process of the present invention. Olefins which can be homopolymerized or copolymerized with the invention catalysts include aliphatic mono-1-olefins. While the invention would appear to be suitable for use with any aliphatic mono-1-olefin, those olefins having 2 to 18 carbon atoms are most often used. The mono-1-olefins can be polymerized according to the present invention employing either a particle form process, a solution form process, or a gas phase process. Aliphatic mono-1-olefins can be copolymerized with other 1-olefins and/or with other smaller amounts of other ethylenically unsaturated monomers, such as 1,3-butadiene, isoprene, 1,3-pentadiene, styrene, alpha-methylstyrene, and similar ethylenically unsaturated monomers which do not impair the catalyst.

The catalysts of this invention can also be utilized to prepare homopolymers and copolymers of conjugated diolefins. Generally the conjugated diolefins contain 4 to 8 carbon atoms per molecule. Examples of suitable conjugated diolefins include 1,3-butadiene, isoprene, 2-methyl-1,3-butadiene, 1,3-pentadiene, and 1,3-octadiene. Suitable comonomers, besides the conjugated diolefins listed above include mono-1-olefins previously described and vinylaromatic compound generally. Some suitable vinylaromatic compounds are those having from about 8 to about 14 carbon atoms per molecule, and include for example styrene and various alkylstyrenes, such as 4-ethylstyrene and such as 1-vinylnaphthalene.

The weight percent of the conjugated diolefin in the copolymerization mixture can be selected over a relatively broad range. Generally the weight percent of the conjugated diolefin is from about 10 to about 95 weight percent and the other comonomers are from about 90 to about 5 weight percent. However, the weight percent of the conjugated diolefin is preferably from about 50 to about 90 weight percent and the other comonomers are from about 50 to about 10 weight percent.

In one aspect of the invention, the catalysts of the present invention have been found to be particularly effective for polymerization of mono-1-olefins such as ethylene as extremely high productivities have been obtained and thus mono-1-olefins such as ethylene are the preferred monomers for use with the catalysts of the present invention.

The polymerization process according to the present invention employing the catalysts and cocatalysts as above described can be performed either batchwise or continuously. In a batch process, for example, a stirred autoclave is prepared by first purging with nitrogen and then with a suitable compound, such as isobutane for example. When the catalyst and cocatalyst are employed either can be charged to the reactor first or they can be charged simultaneously through an entry port under an isobutane purge. After closing the entry port, hydrogen, if used, is added, and then a diluent such as isobutane is added to the reactor. The reactor is heated to the desired reaction temperature, which for polymerizing ethylene, for example, is, for best results, generally within a range of about 50° C. to about 120° C. and the ethylene is then admitted and maintained at a partial pressure within a range of about 0.5 MPa to about 5.0 MPa (70–725 psig) for best results. At the end of the designated reaction period, the polymerization reaction is terminated and the unreacted olefin and isobutane are vented. The reactor is opened and the polymer, such as polyethylene, is collected as a free-flowing white solid and is dried to obtain the product.

In a continuous process, for example, a suitable reactor such as a loop reactor is continuously charged with suitable quantities of solvent or diluent, catalyst, cocatalyst, polymerizable compounds and hydrogen if any and in any desirable order. The reactor product is continuously withdrawn and the polymer recovered as appropriate, generally by flashing the diluent (solvent) and unreacted monomers and drying the resulting polymer.

The olefin polymers made with the catalysts of this invention are useful in preparing articles by conventional polyolefin processing techniques such as injection molding, rotational molding, extrusion of film, and the like. For example, polyethylene made with the catalysts of this invention is typically of narrow molecular weight distribution which is especially desirable for injection molding applications. Furthermore, the polyethylene produced as described generally has a desirable high bulk density of about 0.44 g/cc as recovered from the polymerization zone. In addition, the polyethylene produced as described is characterized by a high degree of stiffness, e.g. high flexural modulus, which is also desirable in many applications. Also, the polyethylene particles produced are characterized by low fines content.

EXAMPLE II

Catalyst Preparation

NONPREPOLYMERIZED CATALYST A

All mixing and filtering operations were performed in a dry box (essential absence of air, i.e. oxygen, and water) under a dry nitrogen atmosphere employing dry n-heptane as the reaction medium. Anhydrous magnesium dichloride and titanium tetraethoxide (unless otherwise noted) were charged to a flask equipped for refluxing and stirring the contents of the flask. The mixture was brought to reflux temperature (about 100° C.), refluxed for the time shown in Table 2, cooled and filtered if extraneous or undissolved material was present. The product was cooled in an ice bath and the indicated organoaluminum halide compound was added to the product at a rate sufficient to avoid a significant temperature rise to produce a slurry. The resulting slurry was stirred about 30 minutes after removal of the flask from the ice bath. The slurry was filtered to produce a filter cake which was washed with portions of dry n-hexane and dried under a nitrogen purge to produce the product.

The quantities of the materials employed, weight and mole ratios of reactants charged and results obtained are given in Table 2.

TABLE 2

| Catalyst Designation | PREPARATION OF CATALYSTS (Catalyst A) | | | | | | | | | |
|---|---|---|---|---|---|---|---|---|---|---|
| | A-1 | A-2 | A-3 | A-4 | A-5 | A-6 | A-7 | A-8 | A-9 | A-10 |
| MgCl$_2$ | | | | | | | | | | |
| Grams | 0.950 | 9.518 | 0.955 | 2.856 | 2.856 | 0.952 | 0.952 | 9.516 | 0.952 | 0.952 |
| mole | 0.010 | 0.100 | 0.010 | 0.030 | 0.030 | 0.010 | 0.010 | 0.100 | 0.010 | 0.010 |
| Ti(OR)$_4$[(1)] | | | | | | | | | | |
| grams | 4.460 | 45.59 | 4.554 | 13.673 | 13.673 | 4.540 | 4.540 | 45.60 | 3.403 | 4.54 |
| mole | 0.0196 | 0.200 | 0.020 | 0.060 | 0.060 | 0.020 | 0.020 | 0.200 | 0.010 | 0.02 |
| 2nd Catalyst Component | | | | | | | | | | |

TABLE 2-continued

PREPARATION OF CATALYSTS (Catalyst A)

| Catalyst Designation | A-1 | A-2 | A-3 | A-4 | A-5 | A-6 | A-7 | A-8 | A-9 | A-10 |
|---|---|---|---|---|---|---|---|---|---|---|
| Type | EASC[2] | EASC[2] | EADC[3] | EADC[3] | DEAC[4] | DEAC[4] | i-BADC[5] | EASC[2] | EASC[2] | EASC[2] |
| ml | 17.5 | 250 | 13.5 | 27 | 52 | 26.5 | 16.7 | 250 | 12.5 | 12.0 |
| mole | 0.0140 | 0.200 | 0.020 | 0.040 | 0.0393 | 0.020 | 0.020 | 0.200 | 0.010 | 0.01 |
| Reaction Diluent[7] | | | | | | | | | | |
| ml | 30 | 550 | 60 | 150 | 150 | 60 | 60 | 530 | 60 | 50 |
| Reflux, Min. | 20 | 45 | 60 | 60 | 60 | 60 | 60 | 60 | 80 | 45 |
| Wash Liquid[6] | | | | | | | | | | |
| ml | 50 | 600 | 40 | 50 | 50 | 60 | 50 | 250 | 30 | 30 |
| Mole Ratios | | | | | | | | | | |
| Ti/Mg | 1.96:1 | 2:1 | 2:1 | 2:1 | 2:1 | 2:1 | 2:1 | 2:1 | 1:1 | 2:1 |
| Ti/2nd catalyst comp. | 1.4:1 | 1:1 | 1:1 | 1.5:1 | 1.53:1 | 1:1 | 1:1 | 1:1 | 1:1 | 2:1 |
| Recovered Product | | | | | | | | | | |
| grams | 2.948 | 25.54 | 2.925 | 3.136 | 2.868 | 2.615 | 2.828 | 29.440 | 1.350 | 3.250 |
| Color | off-white | brown | white | pink-brown | lt. brown | cream | white | lt. brown | lt. brown | lt yellow |

Notes:
[1]Ti(OR)$_4$ in catalysts A-1 through A-8 and A-10 was Ti(OC$_2$H$_5$)$_4$. In catalyst A-9, it was Ti(O n-C$_4$H$_9$)$_4$.
[2]EASC is ethylaluminum sesquichloride, 25 wt. % in n-heptane.
[3]EADC is ethylaluminum dichloride, 25 wt. % in n-hexane.
[4]DEAC is diethylaluminum chloride, 12.96 wt. % in n-hexane.
[5]i-BADC is isobutylaluminum dichloride, 25.4 wt. % in n-hexane.
[6]n-Hexane.
[7]n-Heptane.

EXAMPLE III

Catalyst Preparations

NONPREPOLYMERIZED CATALYST B

All mixing and filtering operations were conducted in a dry box under a nitrogen atmosphere employing dry n-hexane as the reaction medium. To a flask equipped for stirring was charged the n-hexane, catalyst A and titanium tetrachloride. Generally, each mixture was stirred about 1 hour at ambient temperature, e.g., about 25° C., and then filtered. The filter cake was washed with portions of dry n-hexane and dried under a nitrogen purge. The dry powdery product was sieved through a 50 mesh screen to remove the larger particles.

The quantities of components employed, weight ratios of catalyst A to TiCl$_4$ and results obtained are given in Table 3.

| Element | Nonprepolymerized Catalyst A-2 | Nonprepolymerized Catalyst B-2 |
|---|---|---|
| Carbon | 17.5 | 10.1 |
| Hydrogen | 5.0 | 2.6 |
| Chlorine | 39.4 | 54.7 |
| Oxygen[10] | 16.2 | 10.9 |
| Titanium | 11.9 | 13.0 |
| Magnesium | 7.6 | 7.2 |
| Aluminum | 2.4 | 1.5 |

[10]The amount of oxygen was determined by subtracting total weight of other components from the total weight of the catalyst sample.

The results indicate that treating nonprepolymerized catalyst A compositions with TiCl$_4$ has some effect on the amount of the elements making up the compositions. The Ti concentration increased 1.1 wt. % and chlorine concentration increased 15.3 wt. % at the expense of carbon, hydrogen and oxygen in particular.

TABLE 3

PREPARATION OF CATALYSTS (Catalyst B)

| Catalyst Designation | Catalyst A No. | Catalyst A grams | TiCl$_4$ grams | Weight Ratio TiCl$_4$/Catalyst A | Hydrocarbon Used ml. Reaction Diluent | Hydrocarbon Used ml. Wash | Reaction Time Min. | Recovered Product grams | Recovered Product Color |
|---|---|---|---|---|---|---|---|---|---|
| B-1 | A-1 | 1.014 | 4.992 | 4.9:1 | 20 | 20 | 60 | 0.796 | grayish |
| B-2[8] | A-2 | 25.140 | 129.450 | 5.1:1 | 460 | 500 | 75 | 25.540 | brown |
| B-3 | A-3 | 1.000 | 5.000 | 5:1 | 20 | 30 | 60 | 0.771 | grayish |
| B-4 | A-4 | 0.984 | 5.000 | 5.1:1 | 20 | 30 | 25 | 0.790 | grayish |
| B-5 | A-5 | 1.000 | 5.000 | 5:1 | 20 | 30 | 60 | 1.025 | lt. brown |
| B-6 | A-6 | 1.000 | 5.000 | 5:1 | 20 | 30 | 60 | 0.870 | grayish |
| B-7 | A-7 | 1.000 | 5.000 | 5:1 | 20 | 30 | 60 | 0.695 | white |
| B-8[9] | A-8 | 25.440 | 146.710 | 5.8:1 | 550 | 300 | 60 | 27.498 | brown |
| B-9 | A-9 | 1.210 | 6.000 | 5:1 | 20 | 20 | 60 | 1.095 | lt. brown |
| B-10 | A-10 | 2.000 | 10.000 | 5:1 | 40 | 45 | 60 | 1.639 | yellow-brown |

Notes:
[8]21.040 grams of recovered product were diluted with 84.054 grams of 50 mesh polyethylene fines dried in a vacuum oven and the mixture was roll milled overnight (approx. 13 hours). Mixed catalyst consists of about 1 part by weight active component and 4 parts by weight diluent. The mixture was kept under N$_2$.
[9]27.498 grams of recovered product were diluted with 108.502 grams of dry polyethylene fines and processed as described in footnote (8). The mixture was kept under N$_2$. Mixed catalyst consists of about 1 part by weight active component and 3.95 parts by weight diluent.

Elemental analyses of nonprepolymerized catalysts A and B (not mixed with polyethylene fines) were performed and the results obtained are shown below in terms of wt. % of each element:

From the above results it is believed that the halide ion exchanging source, which in this instance was titanium tetrachloride, caused an exchange of chloride for ethoxide groups in the catalyst.

Nonprepolymerized catalysts A-2 and B-2 were also examined by powder X-ray diffraction and X-ray photoelectron spectroscopy to measure the surface composition and bulk crystalline phases.

The results indicated no significant differences in the elemental composition of the surface within experimental error. However, nonprepolymerized catalyst B-2 appeared to be amorphous whereas nonprepolymerized catalyst A-2 appeared to have a highly crystalline component present.

EXAMPLE IV-Catalyst Preparation

A series of catalysts following the general teaching disclosed above and in addition including the prepolymer feature of this invention for all invention catalysts was prepared in a Pfaudler reactor.

Catalyst B-11: 15.8 wt. % prepolymer.

Under a nitrogen atmosphere, a 30 gal (113.6 L) Pfaudler reactor was charged with about 19 gal (72 L) of dry n-hexane, 1085.8 g (11.41 moles) of dry $MgCl_2$ passed through a 50 mesh screen (U.S. Sieve Series), and 12.0 lbs. (23.86 moles) of titanium tetraethoxide ($Ti(OEt)_4$). The mixture was heated to 90° C. and held at that temperature for 30 minutes while stirring. The mixture was then cooled to about 30° C. and while stirring, 26.0 lbs. (12.49 moles) of ethylaluminum sesquichloride (EASC) as a 26.2 wt. % solution in n-heptane, was added over a 67 minute period of time. The reaction mixture was stirred an additional 20 minutes, stirring was discontinued and the slurry allowed to settle after which it was washed twice by decantation with about 15 gal. (57 L) portions of dry n-hexane. Following the second decanting, about 10 gal. (38 L) of dry n-hexane was added to the mixture, and while still maintaining a nitrogen atomsphere above it the mixture was left overnight.

The next morning the reactor was purged of nitrogen with dry ethylene. While under an ethylene pressure of 65 psia (0.45 MPa), the contents at a temperature of about 30° C. were treated with 1.0 lb (0.48 moles) of the EASC solution while stirring, the total time consumed being 30 minutes. Stirring was stopped, the reactor was purged with nitrogen, the solids allowed to settle, mother liquor decanted and the solids washed twice with about 10 gal. per wash of dry n-hexane.

Following the second decanting an additional 10 gallon portion of dry n-hexane was added to the reaction mixture plus 14.0 lbs. (33.47 moles) of $TiCl_4$. The mixture at a temperature of about 30° C. was stirred for one hour, stirring was stopped, and the solids allowed to settle. The mother liquor was decanted and the solids washed 4 times with decanting with about 10 gal of dry n-hexane per wash as before. The slurry still under a nitrogen blanket was transferred to a receiver for storage. Subsequent analysis of a portion of the product revealed that the prepolymer content (dry basis) was 15.8 wt. %. The estimated titanium content of the catalyst is in the 11-13 wt. % range based upon results obtained for related catalysts made in a similar fashion.

The $Ti(OEt)_4$:$MgCl_2$ mole ratio was 2.09 and the $Ti(OEt)_4$:EASC mole ratio was 1.91.

Catalyst B-12: 12.2 wt. % prepolymer

Under a nitrogen atmosphere, the Pfaudler reactor was charged with about 8.5 gal. (32 L) of dry mixed xylenes, 1148.6 g (12.06 moles) of dry sieved (as before) $MgCl_2$, and 12.0 lbs. (23.86 moles) of $Ti(OEt)_4$. As for invention catalyst B-11, the mixture was heated to about 90° C. and held there for 30 minutes while stirring. The mixture was then cooled to about 30° C. and held at that temperature while 26.0 lbs. (12.49 moles) of the 26.2 wt. % EASC solution was added over a 65 minute period while stirring, and stirring was continued an additional 20 minutes after addition of the EASC was completed. Agitation was stopped, the solids allowed to settle, mother liquor decanted, the solids washed one time with 15 gal (57 L) of dry n-hexane, the supernatant liquid removed by decanting and about 15 gal. of dry n-hexane was added. The mixture was then left undisturbed overnight like the previous preparation of catalyst B-11.

The next morning, approximately 15 gal. of the supernatant liquid was decanted and replaced with about 10 gal. of fresh, dry n-hexane. The nitrogen atmosphere in the reactor was then purged with dry ethylene leaving an ethylene pressure at 65 psia as before while adding to the stirred contents at about 30° C., 1.0 lb (0.48 mole) of the EASC solution with the total time consumed for the operation of 30 minutes. Stirring was stopped, the reactor purged with nitrogen, the solids allowed to settle, mother liquor decanted, and the solids washed twice with about 10 gal. per wash of dry n-hexane. Following the second decanting, an additional 10 gal. portion of dry n-hexane was added to the reaction mixture along with 14.3 lbs (34.19 moles) of $TiCl_4$. The mixture at a temperature of about 30° C. was then stirred for one hour, agitation was stopped, the solids allowed to settle, and the mother liquor decanted. As before, the solids were washed 4 times with decanting with about 10 gal. of dry n-hexane per wash and the final product transferred still under a nitrogen blanket to a receiver for storage. Subsequent analysis revealed that the prepolymer content of the catalyst (dry basis) was 12.2 wt. % and the titanium content was 11.5 wt. %.

The $Ti(OEt)_4$:$MgCl_2$ mole ratio was 1.91.

Catalyst B-13: No prepolymer.

Under a nitrogen blanket, the Pfaudler reactor was charged with about 19 gal. (72 L) of dry n-hexane, 1140.6 g (11.98 moles) of dry sieved (as before) $MgCl_2$, and 12.0 lbs. (23.86 moles) of $Ti(OEt)_4$. The stirred mixture was heated to 90° C. and maintained at 91° C.±1° C. for 45 minutes and then cooled to 30° C. Then 25.0 lbs. (12.00 moles) of the 26.2 wt. % EASC solution was added to the stirred mixture over a 120 minute period while maintaining a temperature of 29° C.±1° C. The mixture was stirred an additional hour, stirring was stopped and the solids were allowed to settle. The mother liquor was decanted and the solids were washed twice with about 15 gal. of dry n-hexane per wash leaving the mixture and the second wash liquid in the reactor overnight in undisturbed fashion under nitrogen.

The next morning the supernatant liquid was decanted and the solids washed twice more with decanting with about 15 gal. portions of dry n-hexane. Following the last decanting about 15 gal. of fresh dry n-hexane and 25.0 lbs. (59.77 moles) of $TiCl_4$ were added. The stirred mixture was held at 30° C. for 1 hour, agitation was stopped, and the solids allowed to settle. As before, the product was washed with decanting 4 times with about 15 gal. dry n-hexane per wash, leaving the fourth wash in place overnight. The next morning the supernatant liquid was decanted and the product slurry transferred under nitrogen to a receiver for storage. As for catalyst B-11, the estimated titanium content of catalyst B-13 is in the 11-13 wt. % range.

The $Ti(OEt)_4$:$MgCl_2$ mole ratio was 1.99:1 and the $Ti(OEt)_4$:EASC mole ratio was 1.99:1.

EXAMPLE V-Ethylene Polymerization

Portions of each catalyst were employed in polymerizing ethylene in a 1 gal. (3.8 L) stirred reactor at 100° C. and 1 hour, and in a 11.3 gal. (42.8 L) loop reactor at the indicated temperatures for about 1 hour.

The use of the small 3.8 liter loop reactor and isolation of the polymer is generally as follows.

A 3.8 liter, stirred, stainless steel reactor was employed for ethylene polymerization. The reactor was conditioned for each run by charging to it 3 liters of dry n-heptane, closing the port, and heating the reactor and contents at 175° C. for 30 minutes. The reactor was drained and residual heptane purged with dry nitrogen. The reactor was then closed and cooled under nitrogen pressure.

The conditioned reactor was purged with dry isobutane vapor and cocatalyst solution as indicated below was charged followed by addition of the catalyst. The reactor was closed, about 2.1 liters of dry isobutane was charged, the reactor and contents were heated to 80° C. and the ethylene and hydrogen, if used, was added.

Each run was terminated by flashing the ethylene and isobutane and hydrogen, if present, from the reactor. The polymer was then recovered, dried and weighed to obtain the yield.

Each polymer yield was divided by the weight of catalyst employed to determine the calculated catalyst productivity which is expressed as kilograms (kg) polyethylene per gram (g) catalyst per hour.

The conditions employed in the small reactor and the results obtained are given in Table 5A. In each run, 0.5 mL of triethylaluminum (TEA, 0.5 mmole TEA) as a 15 wt. % solution in n-heptane was used as the cocatalyst. Polymer fines are based on dry reactor product ground in a stainless steel Waring Blendor, Model 31 BL 42, operated at speed setting 7 (highest speed).

The use of the 42.8 L loop reactor and isolation of the polymer is generally as follows.

Runs conducted in a liquid full 42.8 L (11.3) gal) loop reactor containing isobutane as diluent for 1 hour after establishing equilibrium, were at a nominal reactor pressure of 4.10 MPa (595 psia) and a nominal reactor temperature of about 100° C. Effluent was periodically discharged from the reactor and passed to a flash chamber where the polymer was recovered, dried and sieved. Diluent was intermittently admitted to the reactor along with a dilute solution of triethylaluminum in n-hexane, e.g. 0.5 wt % in n-hexane, and intermittent addition of catalyst sufficient to maintain the production rate desired. Hydrogen was used as a molecular weight modifier for the polymer. The calculated solids level in the reactor was maintained at about 28 wt %. A polymer production rate of about 15 lbs/hr polyethylene was obtained during the runs. Circulation in the reactor was accomplished by means of an agitator operating at 1850 RPM in each run. Polymer fines were determined as that portion of each dry, recovered polyethylene passing through a 100 mesh screen (U.S. Sieve Series).

The conditions employed in the loop reactor operating in the liquid full condition at steady state conditions, at a nominal reactor pressure of 4.10 MPa (595 psia), agitator speed of 1850 RPM, and production rate of about 15 lbs/hour polyethylene are shown in Table 5B. Polymer fines are based on dry as made polymer that was sieved. It has been found that grinding the recovered, dry loop reactor product in a Waring Blendor does not significantly increase the amount of polymer fines.

TABLE 5A

ETHYLENE POLYMERIZATION, 3.8 LITER STIRRED REACTOR

| Run No. | Catalyst Prepolymer Wt. % | Catalyst No. | Weight Cgd mg | Pressures, MPa(a) H$_2$ | Ethylene | Total | Prod. Kg/g(b) | Polymer MI | Wt. % Fines(c) |
|---|---|---|---|---|---|---|---|---|---|
| 1 | 15.8 | B-11 | 44 | 0.448 | 1.48 | 3.72 | 103 | 0.38 | 27 |
| 2 | 15.8 | B-11 | 39 | 0.931 | 1.48 | 4.14 | 77.9 | 11.1 | 40 |
| 3 | 12.0 | B-12 | 14 | 0.448 | 1.48 | 3.69 | 94.0 | 0.93 | 32 |
| 4 | 12.0 | B-12 | 20 | 0.896 | 1.48 | 4.14 | 65.0 | 9.4 | 35 |
| 5 | 0 | B-13 | 89 | 0.448 | 1.48 | 3.76 | 57.9 | 1.4 | 31 |
| 6 | 0 | B-13 | 49 | 0.931 | 1.48 | 4.48 | 66.7 | 10.2 | 36 |

(a)Hydrogen partial pressure charged to reactor from a 360 mL bomb. Ethylene partial pressure charged to reactor. Average pressure during the run based on psia.
(b)Kilograms polymer per g catalyst per hour.
(c)Dry polymer ground 2 minutes in Waring Blender at high speed.

TABLE 5B

ETHYLENE POLYMERIZATION, 42.8 Liter Loop Reactor

| Run No. | 7 | 8 | 9 |
|---|---|---|---|
| Catalyst No. | B-11 | B-12 | B-13 |
| Wt. % Prepolymer on Catalyst | 15.8 | 12.0 | 0 |
| Rounds/Hour Catalyst Charged | 15.4 | 13.5 | 8.9 |
| Cocatalyst Conc (ppm based on diluent) | 34.5 | 20.2 | 21.2 |
| Reactor Temp. °C. | 100.3 | 102.0 | 103.5 |
| Ethylene Concentration, Mole Percent | 6.2 | 6.1 | 6.1 |
| Hydrogen Concentration, Mole Percent | 0.85 | 0.86 | 0.77 |
| Calculated Wt. % Solids | 28.8 | 29.6 | 28.8 |
| Productivity, kg/g catalyst | 89.3 | 121.0 | 92.1 |
| Polymer Melt Index | 30.3 | 30.3 | 31 |
| Polymer Density, g/cc | 0.964 | 0.964 | 0.966 |
| Polymer Fines, Wt. % Less than 100 Mesh | 11 | 12 | 57 |
| Polymer Bulk Density, lbs/ft$^3$ (g/cc) | 28.7 (0.460) | 28.5 (0.457) | 33.0 (0.529) |

(d)0.08 mL/round
(e)0.05 mL/round

The particle size distribution or fines determination of the recovered polymer as made and/or ground in a Waring Blendor was determined by placing about 100 grams of the polymer on a set of mechanically agitated sieves. The sieve set consisted of sieves having the mesh sizes (U.S. Sieve Series) of 30, 50, 80, 100, 200 and the bottom pan. Agitation was conducted for 30 minutes unless indicated otherwise and the amount of polymer remaining on each sieve and in the pan was determined by weighing. The ground samples were agitated for 2 minutes at high speed at room temperature in a Waring Blendor. The purpose of grinding the as made polymer is to simulate the attrition polymer particles appear to receive in a large scale reactor such as a loop reactor, for example, since commercially formed polymer particles are generally subjected to substantial agitation which results in the production of finer particles as compared to those made on the bench scale.

Grinding the polymer in a Waring Blendor as referred to above and throughout this application is carried out by grinding 100 grams of the polymer fluff in a dry condition at room temperature (25° C.) for 2 minutes using the highest speed on a Waring Blendor Model 31DL42 manufactured by Waring Products Division, Dynamics Corporation of America, New Hartford, Conn. Although most any grinder or blender suitable for vigorously agitating relatively small quantities of polymer can be used, the Waring Blendor described above worked very well.

The ground fluff is then screened for 15 minutes. An electric Ro-Tap Sieve Shaker manufactured by the U.S. Tyler Manufacturing Company, Cleveland, Ohio, was used; however, most any sieve shaker could be used or the polymer could be sieved by hand.

The results shown in Table 5A demonstrate that as the polymer melt index increases the amount of fines resulting from the grinding test also increases. Thus, in comparing results it is preferable to do so with polymers having about the same melt index. Since more fines can be expected from high melt index polymer, e.g. about 10 or higher, than from low melt index polymers, e.g. about 1 or lower, it is more convenient in differentiating catalyst performance to focus on high melt index polymer results. Therefore, in this series runs 2, 4 and 6 can be compared and they appear to show no advantage for prepolymer on the catalyst based on the Waring Blendor or polymer grinding test. A significant difference can exist, however, between polymer formed in bench scale polymerization processes and polymer formed in a continuous processes such as, for example, in a loop flow reactor. The difference is that in the bench scale polymerization process the growing polymer is relatively undisturbed on the catalytic site whereas in the continuous polymerization process the growing polymer on the catalyst is subject to shearing forces. Consequently, the grinding test as performed on bench scale polymer product can be regarded as a measure of the relative toughness of the mature polymer particle. To the extent that fines produced in any polymerization process are a function of the toughness of the mature polymer particle, the grinding test can provide accurate predictive information as to the fines produced. To the extent, however, that the fines produced are a function of some other factor such as, for example, fragility of the catalyst particle itself during polymerization, the Waring blender or grinder test results will not necessarily be predictive of pilot plant or commercial plant applications. In practice this means, as has been observed, that good Waring Blendor or grinder test results have generally very good predictive value as to pilot plant or commercial reactor conditions, but that bad results of the Waring Blender or grinder test do not necessarily indicate that the polymer produced in pilot plant or commercial reactors will have high fines.

Hence, the catalysts according to the invention were tested in a (pilot plant) loop reactor. As noted, it is speculated that the polymer grinding test with polymer produced on a bench scale in a stirred reactor gives a measure substantially only of the toughness (integrity) of the agglomerated polymer associated with each catalyst particle and does not necessarily indicate the toughness of the catalyst particle per se. In a stirred bench scale lab reactor, as indicated, the catalyst particles are subjected to relatively mild impeller forces, e.g. impeller speed of 500 to 1150 RPM for a brief period of time before they are protected by the growing polymer layer on each particle. On the other hand, in a loop reactor operating on a continuous basis, for example, the catalyst particles are subjected to much greater shearing forces since the impeller is operated at relatively high speeds, e.g., 1800 RPM, to get good mixing throughout the loop. Also, catalyst is charged intermittently or continuously to the reactor and therefore catalyst and polymer particles are present having a wide distribution of residence times. The as formed polymer in the pilot plant loop reactor system correlates positively with as formed polymer made in large commercial reactors. Regardless of the mechanism involved in polymer particle size formation in such reactors it has been found that the catalyst containing from about 5 to about 20 wt. % or more prepolymer performs very well in the reactors and the amount of polymer product fines is substantially reduced. This is demonstrated in invention runs 7 and 8 of Table 5B compared to control run 9 where the catalyst contained no prepolymer, all polymer produced having about the same melt index of 30-31. The invention catalysts produced polymer containing 11-12% fines whereas the polymer made with the control catalyst contained 57 wt. % fines.

Since excessive fines can produce serious handling problems and present an explosion danger as well, it can be appreciated that the invention catalysts constitute a desirable advance in performance from a technical as well as a safety viewpoint. The higher bulk density of 33 lbs/ft$^3$ of control run 9 compared to the about 28.5 lbs/ft$^3$ for the invention runs 7, 8 can be misleading if viewed from the values alone. The higher bulk density results from the finer particles packing together in the tests. However, the fine particles settle out slower in the reactor settling legs than larger particles thus complicating polymer recovery. The dried, recovered fines also are difficult to feed evenly to an extruder because of bridging and the like and pneumatic transfer of the fines is accomplished with difficulty.

What is claimed is:

1. A process for producing a polyolefin comprising contacting at least one polymerizable compound selected from the group consisting of aliphatic mono-1-olefins, conjugated diolefins, vinyl aromatic compounds and mixtures of any two or more thereof under polymerization conditions with a cocatalyst comprising at least one organometallic compound selected from the group consisting of organometallic compounds of Groups I to III of the Periodic Table and a catalyst prepared by
   (A) mixing a first catalyst component solution and a second catalyst component, wherein the first catalyst component is formed by the chemical combination of:
      (1) a metal halide compound selected from the group consisting of metal dihalide compounds and metal hydroxyhalide compounds and the metal of the metal halide compound is selected from the group consisting of Group IIA metals and Group IIB metals, and
      (2) a transition metal compound in which the transition metals are selected from Groups IVB and VB and the transition metal is bonded to at least one radical selected from the group consisting of hydrocarbyloxides, amides, imides, and mercaptides; and wherein the second catalyst component comprises a precipitating agent selected from the group consisting of (a) organometallic compounds of Groups I, II, and III selected from the group consisting of lithium alkyls, Grignard reagents, dialkyl magnesium compounds, dialkyl zinc compounds, and organoaluminum compounds, (b) metal halides and oxyhalides of metals of Groups IIIA, IVA, IVB, VA, and VB, hydrogen halides, and organic acid halides selected from the group consisting of compounds having the formula

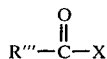

wherein R''' is an alkyl, aryl, or cycloalkyl group or combinations thereof and X is a halide, and (B) depositing prepolymer on said catalyst in an aount sufficient to reduce the amount of polymer fines resulting from said polymerization by contacting said catalyst with monomer in the presence of an adequate amount of a cocatalyst selected from the group consisting of organometallic compounds of Groups I to III of the Periodic Table.

2. A process according to claim 1 wherein the cocatalysts for the polymerization and the prepolymerization can be the same or different and are selected from the group consisting of lithium alkyls, Grignard reagents, dialkyl magnesium compounds, dialkyl zinc compounds, hydrocarbyl aluminum halides, and trihydrocarbyl aluminum compounds.

3. A process according to claim 2 wherein the solid product resulting from the reaction of said first and second components has been further reacted with a halide ion exchanging source.

4. A process according to claim 3 wherein said halide ion exchanging source is selected from the group consisting of titanium tetrahalides, vanadium oxychloride, and zirconium tetrachloride.

5. A process according to claim 4 wherein said prepolymer is deposited on the solid resulting from the reaction of said first and second components prior to treatment with the halide ion exchanging source.

6. A process according to claim 5 wherein said second catalyst component is selected from the group consisting of lithium alkyls, Grignard reagents, dialkyl magnesium compounds, dialkyl zinc compounds, and hydrocarbyl aluminum halides.

7. A method according to claim 6 wherein the amount of prepolymer deposited on said catalyst is in the range of about 1 to about 50 weight percent of the prepolymerized catalyst.

8. A method according to claim 7 wherein said transition metal compound is of the formula $Ti(OR)_4$ wherein each R is individually selected from alkyl radicals containing 1 to 10 carbon atoms per radical.

9. A method according to claim 8 wherein said metal halide compound is magnesium dichloride.

10. A method according to claim 9 wherein said transition metal compound is titanium tetraethoxide.

11. A method according to claim 10 wherein the molar ratio of titanium to magnesium in the reactants used to make said first catalyst component are in the range of about 2:1 to about 1:2.

12. A method according to claim 11 wherein said halide ion exchanging source is titanium tetrachloride.

13. A method according to claim 12 wherein said titanium tetrachloride treatment is conducted at a temperature in the range of about 15° C. to about 50° C.

14. A method according to claim 13 wherein the prepolymer is deposited in such an amount that about 3 to about 40 weight percent of the prepolymerized catalyst is prepolymer.

15. A method according to claim 14 wherein said prepolymer is polyethylene.

16. A method according to claim 15 wherein the second catalyst component is selected from the group consisting of methylaluminum dibromide, ethylaluminum dichloride, ethylaluminum diiodide, isobutylaluminum, dichloride, dodecylaluminum dibromide, dimethylaluminum bromide, diethylaluminum chloride, diisopropylaluminum chloride, methyl-n-propylaluminum bromide, di-n-octylaluminum bromide, diphenylaluminum chloride, dicyclohexylaluminum bromide, dieicosylaluminum chloride, methylaluminum sesquibromide, ethylaluminum sesquichloride, ethylaluminum sesquiiodide.

17. A method according to claim 15 wherein said second catalyst component is ethylaluminum sesquichloride.

18. A method according to claim 11 wherein said second catalyst component is ethylaluminum sesquichloride.

19. A method according to claim 11 wherein:
the metal halide compound is selected from the group consisting of magnesium dihalides;
the transition metal compound is selected from the group consisting of titanium tetraalkoxides;
the second catalyst component is selected from the group consisting of ethylaluminum sesquichloride, ethylaluminum dichloride, and diethylaluminum chloride; and
the halide ion exchanging source is titanium tetrachloride.

20. A method according to claim 11 wherein:
the prepolymer comprises polymer polymerized from at least one monomer selected from the group consisting of aliphatic mono-1-olefins having from 2 to about 20 carbon atoms per molecule and conjugated dienes having from 4 to about 8 carbon atoms per molecule.

21. A process according to any of the preceding claims wherein the polymerizable compound comprises at least 90 weight percent aliphatic mono-1-olefin having from 2 to about 18 carbon atoms per molecule with the remainder of the polymerizable compound selected from the group consisting of acyclic conjugated dienes and vinylaromatic hydrocarbons.

22. A process according to claim 21 wherein the polymerizable compound comprises at least 90 percent ethylene.

23. A process according to claim 22 wherein the polymerizable compound consists essentially of ethylene.

24. A process according to claim 23 wherein during said polymerization said catalyst is employed in conjunction with a cocatalyst consisting essentially of triethylaluminum.

25. A process for producing a polyolefin comprising contacting at least one polymerizable compound selected from the group consisting of aliphatic mono-1-olefins, conjugated diolefins, vinyl aromatic compounds and mixtures of any two or more thereof under polymerization conditions with a cocatalyst comprising at least one organometallic compound selected from the group consisting of organometallic compounds of Groups I to III of the Periodic Table and a catalyst prepared by (A) mixing a first catalyst component solution and a second catalyst component, wherein the first catalyst component is formed by the chemical combination of:
(1) a metal halide compound selected from the group consisting of metal dihalide compounds and metal hydroxyhalide compounds and the metal of the metal halide compound is selected from the group consisting Group IIA metals and Group IIB metals, and
(2) a transition metal compound in which the transition metals are selected from Groups IVB and VB and the transition metal is bonded to at least one radical selected from the group consisting of hydrocarbyloxides, amides, imides, and mercaptides; and wherein the second catalyst comprises a precipitating agent selected from the group consisting of (a) organometallic compounds of Groups I, II, and III selected from the group consisting of lithium alkyls, Grignard reagents, dialkyl magnesium compounds, dialkyl zinc compounds, and organoaluminum compounds, (b) metal halides and oxyhalides of metals of Groups IIIA, IVA, IVB, VA, and VB, hydrogen halides, and organic acid halides selected from the group consisting of compounds having the formula

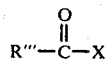

wherein R''' is an alkyl, aryl, or cycloalkyl group or combinations thereof and X is a halide, and
(B) depositing prepolymer on said catalyst in an amount such that the level of prepolymer in said prepolymerized catalyst is in the range of about 1 to about 50 weight percent by contacting said catalyst with monomer in the presence of an adequate amount of a cocatalyst selected from the group consisting of organometallic compounds of Groups I to III of the Periodic Table.

26. A process according to claim 25 wherein the cocatalysts for the polymerization and the prepolymerization can be the same or different and are selected from the group consisting of lithium alkyls, Grignard reagents, dialkyl magnesium compounds, dialkyl zinc compounds, hydrocarbyl aluminum halides, and trihydrocarbyl aluminum compounds.

27. A process according to claim 26 wherein said transition metal compound is of the formula $Ti(OR)_4$ wherein each R is individually selected from alkyl radicals containing 1 to 10 carbon atoms per radical.

28. A process according to claim 25 wherein said metal halide comprises magnesium dichloride, said transition metal compound comprises titanium tetraethoxide, said second component comprises ethyl aluminum sesquichloride, and the solid product resulting from the reaction of said first and second components is reacted with titanium tetrachloride after the prepolymer has been deposited on said solid product.

29. A method according to claim 28 wherein the molar ratio of titanium to magnesium in the reactants used to make said first catalyst component are in the range of about 2:1 to about 1:2.

30. A method according to claim 29 wherein the prepolymer is deposited in such an amount that about 3 to about 40 weight percent of the prepolymerized catalyst is prepolymer.

31. A method according to claim 30 wherein said prepolymer is polyethylene.

32. A process according to claim 31 wherein the polymerizable compound comprises at least 90 percent ethylene.

33. A process according to claim 31 wherein the polymerizable compound is essentially ethylene.

34. A process according to claim 27 wherein said precipitating agent comprises a dialkyl magnesium compound.

* * * * *